(12) United States Patent
Cotte (10) Patent No.: US 12,136,010 B2
(45) Date of Patent: Nov. 5, 2024

(54) PACKAGE COMPRISING A RADIO-FREQUENCY IDENTIFICATION SEAL

(71) Applicant: PA.COTTE SA, Pully (CH)

(72) Inventor: Pierre-Alain Cotte, Amberg (DE)

(73) Assignee: PA.COTTE SA, Pully (CH)

( * ) Notice: Subject to any disclaimer, the term of this patent is extended or adjusted under 35 U.S.C. 154(b) by 20 days.

(21) Appl. No.: 17/798,765

(22) PCT Filed: Mar. 11, 2021

(86) PCT No.: PCT/EP2021/056272
§ 371 (c)(1),
(2) Date: Aug. 10, 2022

(87) PCT Pub. No.: WO2021/185677
PCT Pub. Date: Sep. 23, 2021

(65) Prior Publication Data
US 2023/0087846 A1 Mar. 23, 2023

(30) Foreign Application Priority Data
Mar. 18, 2020 (FR) ....................................... 2002662

(51) Int. Cl.
*G06K 19/077* (2006.01)
(52) U.S. Cl.
CPC .............................. *G06K 19/07798* (2013.01)
(58) Field of Classification Search
CPC ... B65D 55/026; B65D 2401/00; G08B 13/14
See application file for complete search history.

(56) References Cited

U.S. PATENT DOCUMENTS 3,332,549 A * 7/1967 Powell .................. B65D 75/30
206/363
6,459,375 B1 * 10/2002 Wallace ............. A47G 29/1214
340/569

(Continued)

FOREIGN PATENT DOCUMENTS

EP    1087334    3/2001
GB    2446178    8/2008

(Continued)

OTHER PUBLICATIONS

International Search Report and Written Opinion issued by the International Searching Authority, dated May 17, 2021, for International Patent Application No. PCT/EP2021/056272; 15 pages.

*Primary Examiner* — Curtis J King
(74) *Attorney, Agent, or Firm* — Faegre Drinker Biddle & Reath LLP (57) ABSTRACT

The invention relates to a package comprising:
a container having a cavity;
closing means that can adopt, with the container, a closed configuration in which the closing means prevent access to the cavity, or an open configuration in which the closing means allow access to the cavity;
a seal guaranteeing that the package is maintained in its closed configuration, the seal comprising a part that is irreversibly degradable when the package switches from the closed configuration to the open configuration, the seal comprising a radio identification electronic chip.

14 Claims, 4 Drawing Sheets

(56) References Cited

U.S. PATENT DOCUMENTS

| | | | | |
|---|---|---|---|---|
| 6,769,611 | B2* | 8/2004 | Miller | G07F 17/13 235/382 |
| 6,895,241 | B2* | 5/2005 | Hara | G07C 9/33 455/352 |
| 7,116,233 | B2* | 10/2006 | Zhurin | B65D 25/00 119/61.5 |
| 7,398,915 | B1* | 7/2008 | Pineda-Sanchez | A47G 29/1214 340/569 |
| 7,714,708 | B2* | 5/2010 | Brackmann | B60P 3/14 180/290 |
| 8,174,557 | B2* | 5/2012 | Kieffer | H04N 23/51 348/14.05 |
| 9,063,164 | B1* | 6/2015 | Yuen | G01C 22/006 |
| 10,074,247 | B1* | 9/2018 | Tang | G08B 21/0275 |
| 10,198,057 | B2* | 2/2019 | Bae | G06F 1/3293 |
| 10,262,319 | B1* | 4/2019 | Benkreira | G06Q 20/354 |
| 11,250,652 | B2* | 2/2022 | Sengstaken, Jr. | G06K 7/10366 |
| 11,361,603 | B1* | 6/2022 | Ismail | A47J 47/14 |
| 11,830,331 | B2* | 11/2023 | Doyle | G08B 13/06 |
| 2002/0121543 | A1* | 9/2002 | Simmons | A47G 29/1212 232/17 |
| 2005/0122220 | A1* | 6/2005 | Staples | A47G 29/1214 340/569 |
| 2006/0214349 | A1* | 9/2006 | Defosse | G07B 17/00661 271/2 |
| 2006/0224355 | A1* | 10/2006 | Morrison | G06Q 30/0185 702/173 |
| 2007/0057804 | A1* | 3/2007 | Appleyard | G08B 21/0202 340/689 |
| 2008/0245791 | A1* | 10/2008 | Atherton | B65D 5/4233 340/572.1 |
| 2008/0252450 | A1* | 10/2008 | Wandel | B65D 55/026 340/541 |
| 2008/0297346 | A1* | 12/2008 | Brackmann | G01S 19/35 340/572.1 |
| 2010/0265068 | A1* | 10/2010 | Brackmann | G01S 19/48 340/572.1 |
| 2010/0308066 | A1* | 12/2010 | Perry | B65D 51/20 220/378 |
| 2011/0210030 | A1* | 9/2011 | Londo | G08B 13/126 229/102 |
| 2012/0203498 | A1* | 8/2012 | Fleischman | G06F 21/86 702/150 |
| 2012/0235791 | A1* | 9/2012 | Donlan | G06Q 10/0833 340/10.1 |
| 2013/0048667 | A1* | 2/2013 | Wieser | A47K 10/421 221/282 |
| 2014/0075178 | A1* | 3/2014 | Trethewey | G06F 9/448 713/100 |
| 2014/0111333 | A1* | 4/2014 | Haas | G08B 23/00 340/539.11 |
| 2015/0283028 | A1* | 10/2015 | Intini | B65D 43/162 206/438 |
| 2015/0327012 | A1* | 11/2015 | Bian | H04M 1/72457 455/456.1 |
| 2016/0082208 | A1* | 3/2016 | Ballam | A61M 16/0003 128/200.14 |
| 2017/0075740 | A1* | 3/2017 | Breaux | H04W 48/04 |
| 2017/0101237 | A1* | 4/2017 | Capous | B65D 43/22 |
| 2017/0369207 | A1* | 12/2017 | Kugler | B65D 5/42 |
| 2018/0029760 | A1* | 2/2018 | Maser | B65D 43/16 |
| 2018/0144573 | A1 | 5/2018 | Finkenzeller | |
| 2018/0346213 | A1* | 12/2018 | High | B65D 63/1009 |
| 2019/0000255 | A1* | 1/2019 | Dehner | G08B 13/19695 |
| 2019/0021393 | A1* | 1/2019 | Novak | G06F 3/044 |
| 2019/0246194 | A1* | 8/2019 | Aase | H04R 25/305 |
| 2020/0051015 | A1* | 2/2020 | Davis | G06K 19/0723 |
| 2020/0074526 | A1* | 3/2020 | Bikumala | G06Q 30/0633 |
| 2020/0134554 | A1* | 4/2020 | Bikumala | G06Q 10/0837 |
| 2020/0138225 | A1* | 5/2020 | Martin | B65D 55/02 |
| 2020/0372318 | A1* | 11/2020 | Bryant | B65D 55/028 |
| 2021/0215482 | A1* | 7/2021 | Fonk | B65D 79/02 |
| 2021/0243019 | A1* | 8/2021 | Adari | G06Q 10/08 |
| 2021/0406818 | A1* | 12/2021 | Adler | G06Q 10/08 |
| 2022/0055809 | A1* | 2/2022 | Polycarpe | B65D 79/02 |
| 2022/0187155 | A1* | 6/2022 | Eichhorn | G01M 3/3209 |
| 2022/0408973 | A1* | 12/2022 | Pierre | A47J 41/005 |
| 2023/0130945 | A1* | 4/2023 | Sanchez-Olea | B65D 59/04 340/5.8 |
| 2023/0152288 | A1* | 5/2023 | Armitage | H02S 20/10 340/855.1 |
| 2023/0210295 | A1* | 7/2023 | Anderson | F24S 20/60 340/10.1 |

FOREIGN PATENT DOCUMENTS

| | | |
|---|---|---|
| WO | 01/69524 | 9/2001 |
| WO | 2019/040844 | 2/2019 |

* cited by examiner

PACKAGE COMPRISING A RADIO-FREQUENCY IDENTIFICATION SEAL

CROSS-REFERENCE TO RELATED APPLICATIONS

The present application is a national stage entry of International (PCT) Patent Application Number PCT/EP2021/056272, filed Mar. 11, 2021, which claims priority to French Patent Application Number 2002662, filed Mar. 18, 2020, the complete disclosures of which are expressly incorporated herein by reference.

The field of the invention is that of logistics. More specifically, the field of the invention is that of the design and manufacture of secure packages, and of tracking systems allowing to check the condition of the package.

The invention relates more specifically to packages provided with seals.

Packages are used to transport objects within a supply chain. In general, a package is a container defining a cavity in which one or more objects are intended to be positioned during transport.

The packages also comprise means for closing the package to prevent access to the cavity.

For example, a package can be formed by a case defining the cavity, as well as by a cover mounted movable or removable on the case, or by one or more flaps belonging to the case itself. Cases or cardboards are conventionally used to form such packages.

According to another example, a package can be formed by a flexible bag, for example plasticized, which defines the cavity intended to receive the object(s). In this case, the closing means can for example be formed by an adhesive film affixed to the bag previously folded on itself to close an opening allowing access to the cavity. The closing means can also be constituted by an excess section of the material forming the bag and intended to be folded over the opening and then glued to the flexible bag.

In general, it is important to be able to control and/or guarantee the contents of packages.

To this end, securing means can be used on the packages. In particular, seals can be affixed to the packages to verify that they have not been opened.

Seals are conventionally a device fixed to an item to be safeguarded (for example a document, a parcel, a room, . . . ) in such a way that it is impossible, without breaking and damaging the seal, to open this item.

A seal can consist of a single stamp stamped with a seal, such as a wax seal protecting an authentic document, or else a lead seal of the type protecting water or energy consumption meters.

According to another example of a seal, plastic seals are known which allow to guarantee maintaining mail bags, containers or metal cases in a closed configuration. These seals are generally made of plastic material and comprise a body and a link extending from the body. The link is relatively flexible and is intended to form a buckle then to be engaged in a complementary opening of the body. The opening and the link are designed in such a way that the introduction of the link into the opening is irreversible, and that only a degradation, which is in turn irreversible, of the seal allows the opening of the buckle.

A seal thus comprises, according to a conventional design, a part that is irreversibly degradable when the item on which the seal is affixed is opened.

Such seals are particularly simple to manufacture and to implement. However, they do not allow to know precisely, in real time, when an object has been opened, or to know the state of the seal without a visual consultation directly carried out on site, sometimes or often impossible.

In the field of the invention, it is also known to use labels incorporating unique identifiers, such as alphanumeric references, barcodes, or radio frequency identification means (RFID), on bottles of wine.

These electronic labels allow consumers to obtain information inherent to the bottle, previously recorded in a database.

The radio frequency identification means consist in particular of a radio identification electronic chip coupled to an antenna.

To obtain the information contained in the electronic chip, it is necessary to use a transceiver complementary to the antenna and the electronic chip. This transceiver is designed to emit a request by radio intended to be picked up by the antenna and transmitted to the electronic chip, then to receive a response produced by the electronic chip and sent by the antenna.

Thus, such labels allow to tag the bottles in order to ensure the tracking of the great wines and to facilitate inventories without handling the bottles. And for the consumer, he can, via his smartphone, access the detailed product sheet by means of a code (QR code) displayed directly on the label.

In practice, these RFID tags are implemented to meet the expectations of the wine industry, namely wine counterfeiting and product tracking.

However, these specific means are not provided to ensure that a parcel or packaging or else a package has not been opened.

The purpose of the invention is in particular to overcome the disadvantages of the prior art.

More specifically, the purpose of the invention is to provide a secure package using a seal, which allows to know in real time whether the seal has been broken.

This purpose, as well as others which will appear subsequently, is achieved thanks to the invention which relates to a package comprising:
  a container having a cavity;
  closing means that can adopt, with the container, a closed configuration in which the closing means prevent access to the cavity, or an open configuration in which the closing means allow access to the cavity;
  a seal guaranteeing that the package is maintained in its closed configuration; in which the seal comprises:
  a part that is irreversibly degradable when the package switches from the closed configuration to the open configuration;
  a radio identification electronic chip;
  first communication means comprising an antenna, the first communication means being coupled to the electronic chip and extending at least partially into the degradable part of the seal;
characterized in that the package incorporates an electronic unit separate from the seal, the electronic unit comprising:
  a transceiver configured to periodically send a radio request capable of being picked up by the antenna then transmitted to the electronic chip, and to receive a return signal produced by the electronic chip in response to the radio request then transmitted by the antenna, the electronic unit being configured to detect an absence of return signal;

second communication means configured to emit, in the absence of a return signal, an alert signal intended for a remote receiver.

Thanks to the package according to the invention, it is possible to know in real time if the seal guaranteeing the holding of the package in the closed configuration has been degraded. This information thus allows to know that the package was opened for the first time following the affixing of the seal, or its initialization.

Consultation of the remote electronic package tracking unit provides real-time knowledge of this information.

Indeed, opening the package, and in other words switching from its closed configuration to the open configuration, leads to degradation (breakage) of the degradable part of the seal.

Since the first communication means are partially integrated into the degradable part, then they are also degraded when the package is opened.

This degradation of the first communication means then prevents the reception and/or transmission of the request emitted by the transceiver to the radio identification electronic chip, and this electronic chip does not produce a return signal.

More generally, the degradation of the first communication means definitively deactivates the radio identification assembly formed by these first communication means and the radio identification electronic chip.

According to an advantageous feature, the first communication means also comprise at least one breakable electrical conductor coupling the antenna to the radio identification electronic chip, the breakable electrical conductor(s) passing through the degradable part of the seal.

In this case, during the degradation of the seal, the breakable electrical conductor(s) are broken. Degradation of the seal thus leads to decoupling the radio identification electronic chip from the antenna through degradation of the breakable electrical conductor(s).

This solution is easy to implement because only the breakable electrical conductor(s) have to pass through the degradable part of the seal.

According to a preferred design, each of the container and the closing means has a member for receiving the seal, the two receiving members being in close proximity to each other in the closed configuration of the package, and in that the seal takes the shape of a collar intended to be coupled to each of the receiving members in the closed configuration of the package.

This design offers particularly great ease of implementation of the package according to the invention and of its seal.

Indeed, all a user has to do is close the package and then affix the seal to the two receiving members for the seal to be installed.

For example, the two receiving members can each take the shape of a ring through which the collar is inserted to form an inviolable buckle.

The two receiving members can also each take the shape of a hook and, in this case, the shape of the hooks prevents the seal from being removed without being broken, the collar then having to be tightened snugly on the two hooks.

According to a particular embodiment, the collar comprises:
a head carrying a cage;
a strip made of flexible material extending from the head, and being complementary to the insertion of the cage, the strip forming the degradable part of the seal.

The collar thus has a shape that is easy and inexpensive to implement.

In this case, advantageously, the strip extends from the head to a free end, the breakable electrical conductor(s) extending along the strip between the head and the free end.

This design allows the collar to form a larger or smaller buckle depending on how deeply the strip is inserted into the cage.

Indeed, since the electrical conductor(s) extend along the strip between the head and the free end, then the strip can be cut at any place between the head and the free end of the strip while producing the desired decoupling effect between the radio identification electronic chip and the antenna.

More specifically, according to an advantageous feature, the radio identification electronic chip is housed in the free end of the strip, and the antenna of the first communication means is housed in the head of the collar.

This embodiment is particularly easy to be implemented and allows to make the collar appear non-specific to the implementation of a radio identification tag.

More specifically, a person unfamiliar with the package according to the invention is then even less likely to identify the seal comprising the radio identification electronic chip as being a seal different from other conventional seals not comprising such radio identification means.

According to a more particular design, the collar is a self-locking clamp, the cage being a non-return cage.

Such a type of self-locking clamp offers a particularly advantageous simplicity of implementation.

Indeed, in a conventional manner, a user simply has to insert the strip into the non-return cage for the locking of the strip in the cage to be directly effective.

According to an advantageous solution, the electronic unit is housed in a wall, or a bottom, or a cover of the container.

The electronic unit is thus not detectable from inside the container.

The electronic unit is then concealed and contributes to the undetectable nature of the seal's ability to send an alert when the seal breaks.

Advantageously, the electronic unit comprises means for timestamping the alert signal.

In this way, the alert signal comprises a datum relating to the time of breaking the seal and the opening of the package.

This allows a user to record when precisely the seal has been degraded.

The invention also relates to a tracking system comprising:
at least one package according to any one of the preceding claims, the seal of the package comprising an initial identification code written in the radio identification electronic chip;
a computer server integrating the remote receiver, the computer server comprising a database listing certified identification codes, and being configured to identify the initial identification code of the seal in the database.

This tracking system allows to secure the creation of an electronic tracking of the state of the seal.

According to this design, only seals previously known in the database can work.

The invention also relates to a method for tracking a package of the tracking system described above, the method comprising:
a step of emitting a radio request by the transceiver in the direction of the seal, the radio request being capable of being picked up by the antenna then transmitted to the electronic chip;
a step of waiting for reception of a return signal produced by the electronic chip in response to the radio request;

and in that, in the absence of reception of a return signal, the step of waiting for reception of a return signal is followed by a step of broadcasting an alert signal to a remote receiver.

Advantageously, the method comprises, prior to the step of emitting a radio request, a sequence of pairing the seal to the package, the pairing sequence comprising successively:

- a step of reading the initial identification code of the seal by the transceiver;
- a step of transmitting the initial identification code to the computer server by the transceiver;
- a step of identifying the initial identification code by the computer server;
- a step of generating a new unique identification code by the computer server, and of transmitting the new unique identification code to the transceiver;
- a step of sending and writing the new identification code in the seal by the transceiver.

According to the method, a new identification code, generated and certified by the computer server, is written in the radio identification electronic chip of the seal.

In this way, as soon as it is used to secure a package, the seal benefits from a new identity duly listed in the system.

Advantageously, the pairing sequence ends with a test of the presence of the seal on the package by the transceiver.

Preferably, the identification step consists in comparing the initial identification code with the certified identification codes of the database to certify the seal and authorize the step of generating a new unique identification code.

Thus, a seal is either authorized or rejected during the pairing sequence.

Other features and advantages of the invention will appear more clearly upon reading the following description of a preferred embodiment of the invention, given by way of illustrative and non-limiting example, and the appended drawings, among which:

Figure 1:
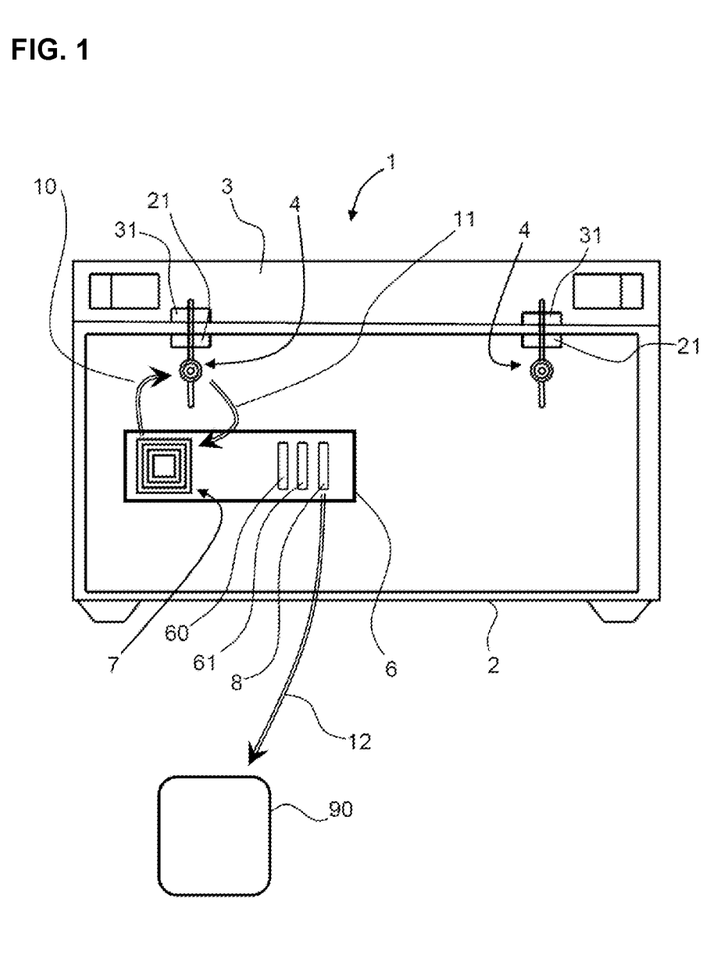
FIG. 1 is a schematic illustration of a package according to the invention, representing the package in a closed configuration, and provided with at least one seal.
Figure 4:
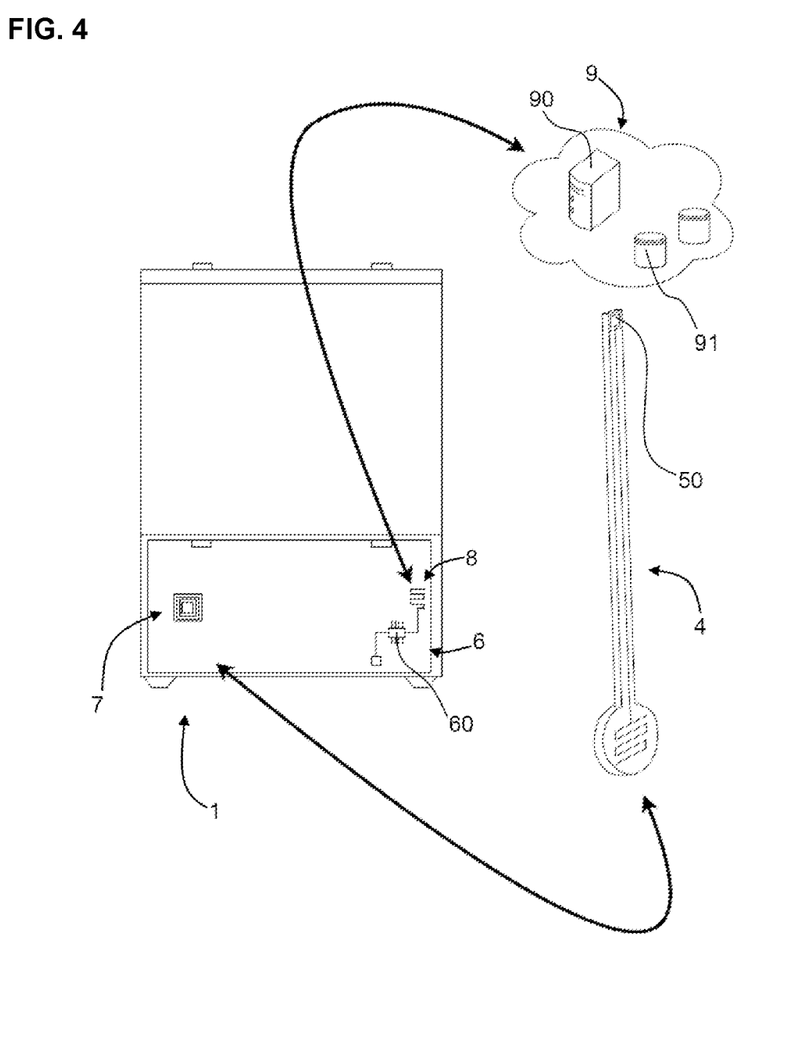
FIG. 4 is a schematic representation of a package tracking system according to the invention.

With reference to FIGS. 1 and 4, a package 1 is illustrated according to the invention.

The package 1 comprises a container 2 and closing means 3.

Figure 3:
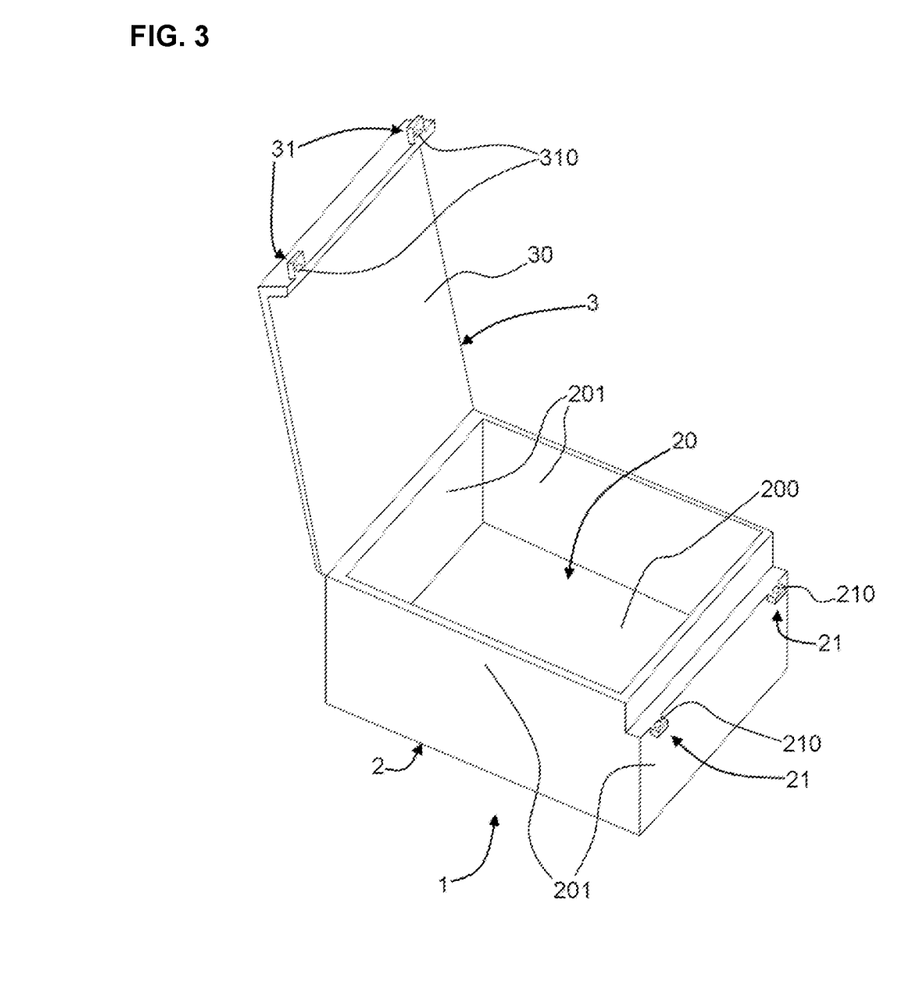
FIG. 3 is a schematic representation in perspective view of a package according to the invention, in an open configuration.

As shown in FIG. 3, the container 2 has a cavity 20.

More specifically, the container 2 is a case composed of a bottom 200 and four walls 201 extending peripherally from the bottom 200.

The walls 201 and the bottom 200 jointly delimit the cavity 20.

Still with reference to FIG. 3, the closing means 3 take the shape of a cover 30.

This cover 30 is hinged on the upper end of one of the walls 201 so as to allow or prevent access to the cavity 20.

More generally, and with reference to FIGS. 1 and 3, the closing means 3 and the container 2 can together adopt either a closed configuration in which the closing means 3 prevent access to the cavity 20 (configuration illustrated by FIG. 1) or else an open configuration in which the closing means 3 allow access to the cavity 20 (configuration illustrated by FIG. 3).

According to other conceivable and not illustrated embodiments, the container 2 can be formed by a flexible bag and the closing means 3 then take the shape of a flap intended to extend covering an opening of the flexible bag.

Figure 2:
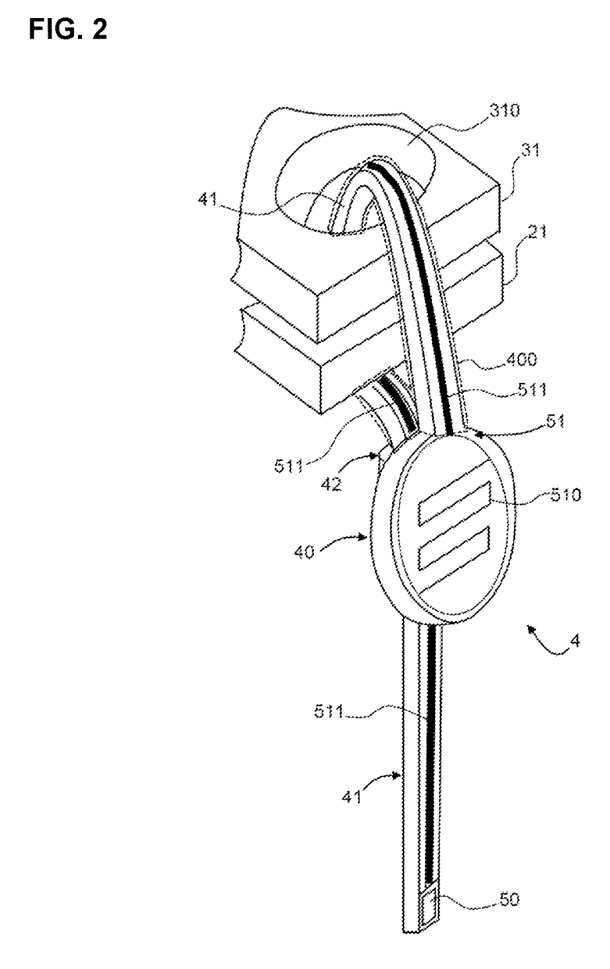
FIG. 2 is a schematic representation illustrating more specifically a seal affixed to a package according to the invention, the seal being more particularly coupled to two package receiving members.

Referring to FIGS. 1, 2 and 3, and as is more detailed below, each of the container 2 and the closing means 3 has at least one member 21, 31 for receiving a seal 4.

In particular, according to the present embodiment, the container 2 has two receiving members 21, and the closing means 3 have two receiving members 31.

According to the principle of the invention, the package 1 also comprises a seal 4 which guarantees holding a package 1 in its closed configuration.

This seal 4 comprises a degradable part 400 which is irreversibly degradable when the package 1 switches from its closed configuration to its open configuration.

In other words, switching the package 1 from its closed configuration to its open configuration is prevented by the seal 4 or else involves breaking the degradable part 400 to allow opening the package 1.

According to this embodiment, the seal 4 takes the shape of a collar which is intended to be coupled to each of the receiving members 21, 31 in the closed configuration of the package 1.

Indeed, the two receiving members 21, 31 of the container and the closing means 3 are in close proximity to each other in the closed configuration of the package 1 as shown in FIGS. 1 and 2.

In particular, the receiving members 21, 31 of the seal, of each of the container 2 and the closing means 3, take the shape of pierced tabs standing opposite each other when the container and the closing means are in the closed configuration of the package 1, as shown in FIGS. 1 and 2.

These pierced tabs each have an opening 210, 310 allowing the introduction of the seal 4, and the formation of a collar by the seal.

More specifically, the collar comprises, as shown in FIG. 2, a head 40 and a strip 41 extending from the head 40.

The head 40 has a disc shape.

This head 40 carries a cage 42.

The strip 41 is formed from a flexible material and is complementary to the insertion of the cage 42. In other words, the strip 41 can be inserted into the cage 42, and passes therethrough.

The collar, and more specifically the head 40 and the strip 41 are in particular made of plastic.

As explained below, the strip 41 forms the degradable part 400 of the seal 4.

More particularly, the collar is a self-locking clamp and the cage 42 is a non-return cage.

In other words, the introduction of the strip 41 through the cage 42 is authorized in one direction but leads irreparably to the captive holding of this strip 41 in the cage 42.

It is thus not possible to remove the strip 41 from the cage 42 without damaging the seal 4.

The buckle formed by the strip 41, between the head 40 and the cage 42, must be damaged if the package 1 is to be opened.

For example, the buckle formed by the strip 41 must be cut using a sharp tool, such as a pair of scissors or a cutter.

Advantageously, the cage 42 and the head 40 have a mechanical resistance to breakage greater than a mechanical resistance to breakage of the band 41.

According to the principle of the invention, and as illustrated by FIG. 2, the seal 4 comprises a radio identification electronic chip 50, as well as first communication means 51 coupled to the electronic chip 50.

The seal 4 comprises an initial identification code. In other words, this identification code is written in the electronic chip 50 of the seal 4.

This initial identification code is specific to each seal.

Potentially, the initial identification code can be shared by several seals 4 which are not yet used. For example, these seals sharing the same initial identification code can be part of the same batch.

As detailed below, the electronic chip 50 is designed to be able to receive a new unique identification code.

Advantageously, this new unique identification code replaces the initial identification code written in the electronic chip 50.

Still with reference to FIG. 2, the first communication means 51 comprise an antenna 510.

Furthermore, the first communication means 51 extend into the degradable part 400 of the seal 4.

According to the present embodiment, the first communication means 51 also comprise a breakable electrical conductor 511 which couples the antenna 510 to the radio identification electronic chip 50.

As shown in FIG. 2, this breakable electrical conductor 511 passes through the degradable part 400 of the seal 4.

According to another possible embodiment, the antenna 510 could be located in the degradable part 400 of the seal 4.

Referring to FIG. 2, the antenna 510 is housed in the head 40 and the breakable electrical conductor 511 extends along the strip 41 to a free end 410 of the strip in which the radio identification electronic chip 50 is housed.

According to this embodiment, the electronic chip 50 and the first communication means 51 are embedded in the seal 4.

In particular, the antenna 510 is embedded in the material forming the head 40 of the seal 4, and the breakable electrical conductor 511 as well as the electronic chip 50 are embedded in the material constituting the strip 41.

With reference to FIGS. 1 and 2, according to the invention, the package 1 also incorporates an electronic unit 6.

This electronic unit 6 is intended to cooperate with the seal 4, and more specifically with the radio identification electronic chip 50 and the first communication means 51.

Indeed, this electronic unit 6 comprises a transceiver 7 which is configured to periodically send a radio request 10 and receive a return signal 11.

The antenna 510, located in the seal 4, allows to pick up this radio request 10.

The radio request 10, after having been picked up by the antenna 510, is transmitted to the electronic chip 50.

According to the present embodiment, the radio request 10 is transmitted to the electronic chip 50 via the breakable electrical conductor 511.

In response to the radio request 10, the electronic chip 50 is configured to produce a return signal 11.

The return signal 11 is formulated by integrating an identification code of the electronic chip 50. Consequently, this return signal 11 can only be produced by the seal 4.

More specifically, and as detailed below, the return signal 11 is formulated by integrating an identification code which is unique, and written in the electronic chip 50. This identification code is in particular the new unique code.

After production, the return signal 11 is conveyed through the divisible electrical conductor 511 and is emitted by the antenna 510.

The transceiver 7 then allows to pick up the return signal 11 emitted by the electronic chip 50 and its antenna 510 in response to the radio request 10 previously emitted.

The electronic unit 6 is also configured to detect an absence of return signal 11.

Indeed, the electronic unit 6 comprises processing means 60 configured to record a return signal 11 in response to the emission of a radio request 10, as well as to detect the absence of reception of a return signal 11 in response to the emission of a radio request 10.

The electronic unit 6 also comprises, according to the invention, second communication means 8 which are, in turn, configured to emit, in the absence of a return signal 11, an alert signal 12 to a remote receiver 90.

These second communication means 8 are controlled by the processing means 60.

The second communication means 8 are in particular designed to allow the emission of the alert signal 12 by means of a wireless communication protocol, such as those implemented for cellular networks or those of the Bluetooth and wifi type.

Referring to FIG. 1, the electronic unit 6 also comprises means 61 for timestamping the alert signal 12.

According to FIGS. 1 and 4, the electronic unit 6 can more specifically take the form of an electronic card integrating the transceiver 7, the second communication means 8, the processing means 60, as well as the timestamp means 61.

According to the present embodiment, this electronic unit 6 is housed or even embedded in one of the walls 201 of the container 2.

In this way, the electronic unit 6 is protected, and potentially made inaccessible, when the package 1 is in an open position as illustrated in FIG. 3.

The package 1 comprises an electric battery (not shown), which is advantageously rechargeable, allowing the electronic unit 6 to be power supplied.

According to a preferred design, the transceiver 7 and the antenna 510 are configured to operate on the ultra-high frequency band.

Referring to FIG. 4, the invention also relates to a tracking system which comprises packages 1 as described above, and a computer server 9

In this system, the remote receiver 90 is integrated into the computer server 9.

The computer server 9 also comprises a database 91.

This database 91 lists identification codes called "certified" identification codes, each corresponding to an initial identification code of a seal 4.

The computer server 9 is configured to analyze the initial identification code transmitted by the electronic unit, and compare it to the certified identification codes of the database 91 in order to identify the initial identification code.

The system implements a method for tracking a package 1 which also forms an object of the invention.

The method comprises:

a step of transmitting a radio request 10 by the transceiver 7 in the direction of the seal 4, the radio request 10 being intended to be picked up by the antenna 510 then transmitted to the electronic chip 50;

a step of waiting for reception of a return signal 11 produced by the electronic chip 50 in response to the radio request 10.

In the absence of reception of a return signal 11, the step of waiting for reception of a return signal 11 is followed by a step of broadcasting an alert signal 12 to a remote receiver 90.

This method also comprises, prior to the steps described above, a pairing sequence aiming at electronically associating the seal 4 with the electronic unit 6 of the package 1.

To this end, the pairing sequence successively comprises:
a step of reading the initial identification code of the seal 4;
a step of transmitting the initial identification code to the computer server 9;
a step of identifying the initial identification code;
a step of generating a new unique identification code, and of transmitting the new unique identification code to the transceiver 7;
a step of sending and writing the new identification code in the seal 4 by the transceiver 7.

The step of reading the initial identification code, and the step of transmitting to the computer server 9 are carried out by the transceiver 7.

Following these two steps, the identification step, and the step of generating and transmitting the new unique identification code are carried out by the computer server 9.

The identification step consists in comparing the initial identification code with the certified identification codes of the database 91 to certify the seal 4 and authorize the step of generating a new unique identification code.

During the step of sending and writing the new identification code in the seal 4 by the transceiver 7, the new unique identification code can be written in the electronic chip 50 to replace the initial identification code.

If the initial identification code is found in the database 91, then the seal 4 is certified. In other words, the seal 4 is authenticated and accepted in the system.

If the initial identification code is not found in the database 91, then the seal 4 is rejected.

Alternatively, or in addition, if the seal 4 is rejected, then the computer server 9 can send a fraudulent pairing signal to the electronic unit 6.

In this case, the system cannot guarantee the electronic tracking of the package 1 using the seal 4.

The invention claimed is:

1. A package comprising:
a container having a cavity;
closing means that can adopt, with the container, a closed configuration in which the closing means prevent access to the cavity, or an open configuration in which the closing means allow access to the cavity;
a seal guaranteeing that the package is maintained in its closed configuration; in which the seal comprises:
a part that is irreversibly degradable when the package switches from the closed configuration to the open configuration;
a radio identification electronic chip;
first communication means comprising an antenna, the first communication means being coupled to the electronic chip and extending at least partially into the degradable part of the seal;
wherein the package incorporates an electronic unit separate from the seal, the electronic unit being housed in a wall, or a bottom, or a cover of the container, the electronic unit comprising:
a transceiver configured to periodically send a radio request capable of being picked up by the antenna then transmitted to the electronic chip, and to receive a return signal produced by the electronic chip in response to the radio request then transmitted by the antenna, the electronic unit being configured to detect an absence of return signal;
second communication means configured to emit, in the absence of a return signal, an alert signal to a remote receiver; and in that each of the container and the closing means has a member for receiving the seal, the two receiving members being in close proximity to each other in the closed configuration of the package, the seal being intended to be coupled to each of the receiving members in the closed configuration of the package.

2. The package according to claim 1, wherein the first communication means also comprise at least one breakable electrical conductor coupling the antenna to the radio identification electronic chip, the breakable electrical conductor (s) passing through the degradable part of the seal.

3. The package according to claim 1, wherein the seal takes the shape of a collar.

4. The package according to claim 3, wherein the collar comprises:
a head carrying a cage;
a strip made of flexible material extending from the head, and being complementary to the insertion of the cage, the strip forming the degradable part of the seal.

5. The package according to claim 4, wherein the strip extends from the head to a free end, the breakable electrical conductor(s) extending along the strip between the head and the free end.

6. The package according to claim 5, wherein the radio identification electronic chip is housed in the free end of the strip, and in that the antenna of the first communication means is housed in the head of the collar.

7. The package according to claim 4, wherein the collar is a self-locking clamp, the cage being a non-return cage.

8. The package according to claim 1, wherein the electronic unit is embedded in a wall of the container.

9. The package according to claim 1, wherein the electronic unit comprises means for timestamping the alert signal.

10. A tracking system comprising:
at least one package, wherein at least one of the at least one package comprises:
a container having a cavity;
closing means that can adopt, with the container, a closed configuration in which the closing means prevent access to the cavity, or an open configuration in which the closing means allow access to the cavity;
a seal guaranteeing that the package is maintained in its closed configuration; wherein the seal comprises:
a part that is irreversibly degradable when the package switches from the closed configuration to the open configuration;
a radio identification electronic chip;
first communication means comprising an antenna, the first communication means being coupled to the electronic chip and extending at least partially into the degradable part of the seal; and
an initial identification code written in the radio identification electronic chip;
wherein the package incorporates an electronic unit separate from the seal, the electronic unit being housed in a wall, or a bottom, or a cover of the container, the electronic unit comprising:
a transceiver configured to periodically send a radio request capable of being picked up by the antenna then transmitted to the electronic chip, and to receive a return signal produced by the electronic chip in response to the radio request then transmitted by the antenna, the electronic unit being configured to detect an absence of return signal;

second communication means configured to emit, in the absence of a return signal, an alert signal to a remote receiver; and in that each of the container and the closing means has a member for receiving the seal, the two receiving members being in close proximity to each other in the closed configuration of the package, the seal being intended to be coupled to each of the receiving members in the closed configuration of the package; and a computer server integrating the remote receiver, the computer server comprising a database listing certified identification codes, and being configured to identify the initial identification code of the seal in the database.

11. A method for tracking at least one package, wherein at least one of the at least one package comprises:

a container having a cavity;

closing means that can adopt, with the container, a closed configuration in which the closing means prevent access to the cavity, or an open configuration in which the closing means allow access to the cavity;

a seal guaranteeing that the package is maintained in its closed configuration; wherein the seal comprises:
  a part that is irreversibly degradable when the package switches from the closed configuration to the open configuration;
  a radio identification electronic chip;
  first communication means comprising an antenna, the first communication means being coupled to the electronic chip and extending at least partially into the degradable part of the seal; and
  an initial identification code written in the radio identification electronic chip;

wherein the package incorporates an electronic unit separate from the seal, the electronic unit being housed in a wall, or a bottom, or a cover of the container, the electronic unit comprising:
  a transceiver configured to periodically send a radio request capable of being picked up by the antenna then transmitted to the electronic chip, and to receive a return signal produced by the electronic chip in response to the radio request then transmitted by the antenna, the electronic unit being configured to detect an absence of return signal;
  second communication means configured to emit, in the absence of a return signal, an alert signal to a remote receiver; and in that each of the container and the closing means has a member for receiving the seal, the two receiving members being in close proximity to each other in the closed configuration of the package, the seal being intended to be coupled to each of the receiving members in the closed configuration of the package, the method comprising:
a step of emitting a radio request by the transceiver in the direction of the seal, the radio request being capable of being picked up by the antenna then transmitted to the electronic chip;
a step of waiting for reception of a return signal produced by the electronic chip in response to the radio request; and
in the absence of reception of a return signal, the step of waiting for reception of a return signal is followed by a step of broadcasting an alert signal to the remote receiver.

12. The method according to claim 11, wherein the method comprises, prior to the step of emitting a radio request, a sequence of pairing the seal to the package, the pairing sequence comprising successively:
  a step of reading the initial identification code of the seal by the transceiver;
  a step of transmitting the initial identification code to the computer server by the transceiver;
  a step of identifying the initial identification code by the computer server;
  a step of generating a new unique identification code by the computer server, and of transmitting the new unique identification code to the transceiver;
  a step of sending and writing the new unique identification code in the seal by the transceiver.

13. The method according to claim 12, wherein pairing sequence ends with a test of the presence of the seal on the package by the transceiver.

14. The method according to claim 12, wherein the identification step consists in comparing the initial identification code with the certified identification codes of the database to certify the seal and authorize the step of generating a new unique identification code.

* * * * *

UNITED STATES PATENT AND TRADEMARK OFFICE
CERTIFICATE OF CORRECTION

| | | |
|---|---|---|
| PATENT NO. | : 12,136,010 B2 | Page 1 of 1 |
| APPLICATION NO. | : 17/798765 | |
| DATED | : November 5, 2024 | |
| INVENTOR(S) | : Cotte | |

It is certified that error appears in the above-identified patent and that said Letters Patent is hereby corrected as shown below:

In the Specification

At Column 8, Line 47, delete "9" and insert --9.--

Signed and Sealed this
Tenth Day of June, 2025

Coke Morgan Stewart
*Acting Director of the United States Patent and Trademark Office*